March 13, 1962 D. C. BORDEN 3,025,413
AUTOMATIC AMPLITUDE CONTROL AND PULSE SHAPING CIRCUIT
Filed June 7, 1957
FIG. 1
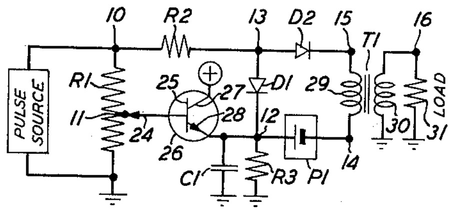
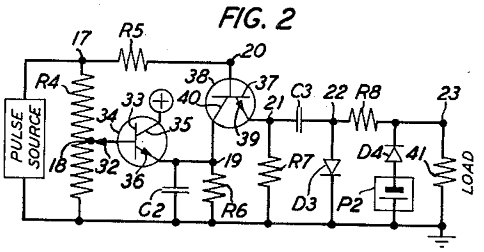
FIG. 3
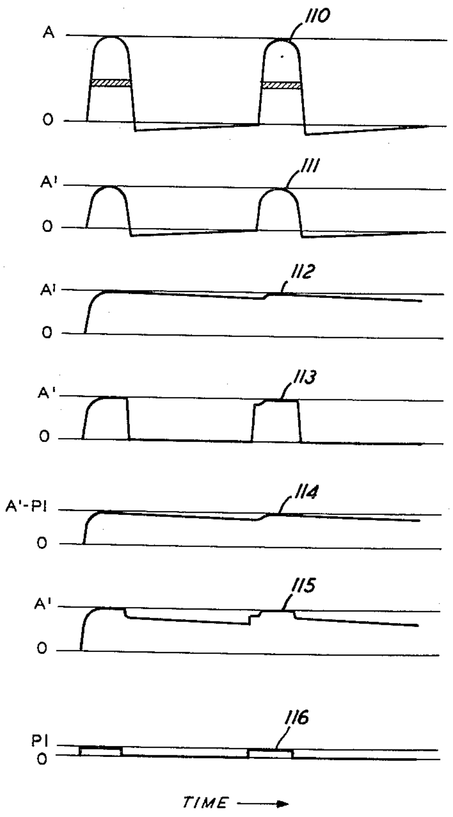
FIG. 4
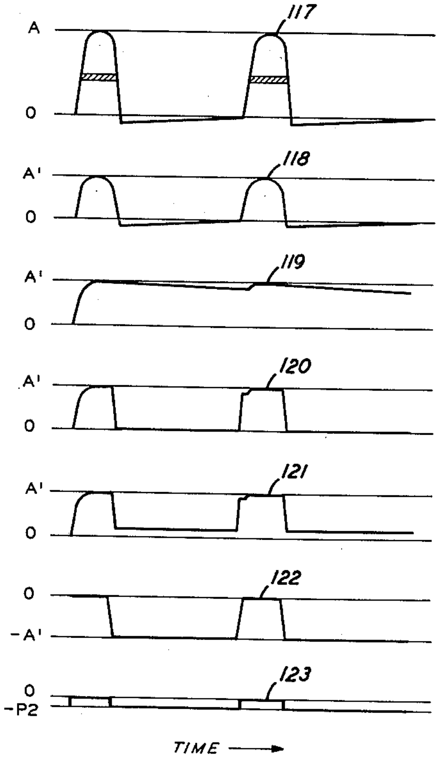
INVENTOR
D. C. BORDEN
BY John E. Cassidy
ATTORNEY United States Patent Office 3,025,413

Patented Mar. 13, 1962

3,025,413

AUTOMATIC AMPLITUDE CONTROL AND PULSE SHAPING CIRCUIT

Dean C. Borden, Maplewood, N.J., assignor to Bell Telephone Laboratories, Incorporated, New York, N.Y., a corporation of New York Filed June 7, 1957, Ser. No. 664,236
2 Claims. (Cl. 307—88.5)

This invention relates to a pulse processing circuit and more particularly to a circuit for producing rectangularly-shaped output pulses.

The use of pulses and trains of pulses for signaling-equipment such as that employed in pulse code modulation systems wherein the presence or absence of a pulse is indicative in coded form of the modulation of a particular wave, and in computer applications wherein the pulses are representative of specific bits of information, requires that these pulses have reliable characteristics. These reliable characteristics include rise and decay times that are short in relation to the pulse width, and an amplitude that is constant.

During transmission and reception, pulses which initially have the characteristics suggested above are often distorted to such a degree that they cannot be utilized to perform the desired operations. There are many factors which cumulatively act to produce distorted pulses, one of the most disturbing of these being noise. The detection of pulses in the presence of noise is most reliably accomplished, in many cases, by sampling the input signal in an interval of time during the period when the pulse is at full amplitude. This sample may then be compared with a reference voltage and if the sampled voltage is greater than the reference voltage, the presence of a pulse is acknowledged. When utilizing a reliable receiver, this detecting procedure appears to yield a minimum error rate in the presence of a given signal-to-noise ratio.

An object of the present invention is the provision of a pulse shaping circuit for eliminating a substantial portion of the noise components in received pulse signals.

Another object of the present invention is the provision of a pulse shaping circuit which utilized a predetermined portion of input pulses to produce substantially rectangularly-shaped output pulses.

Yet another object of the present invention is the provision of a pulse shaping circuit producing constant amplitude output pulses regardless of variations in input pulse amplitude.

The above objectives are achieved by the illustrative circuits embodying this invention wherein means are provided for determining whether or not the sampled signal is greater than a predetermined portion of the normal amplitude of the pulse.

It is a feature of this invention that the reference voltage is determined by the amplitude of the incoming pulses at the time of sampling. Essentially, the circuit examines the incoming signal plus the noise impressed thereon and utilizes this value to perform the function of pulse detection. The circuitry in effect derives the output pulse from a sector of the input pulse which is substantially insensitive to the noise components of the input signal.

As mentioned hereinbefore, the sampling should take place when the pulse is at full amplitude. The embodiments of this invention may be employed either before or after this time sampling process.

From another aspect, the present invention provides circuit means for extracting from a pulse or train of pulses a particular sector, regardless of the amplitude of the pulses.

The foregoing, as well as additional objects and features, will be more clearly understood and appreciated from the following description to be considered in connection with the drawings, wherein:

FIG. 1 is a circuit schematic of one embodiment of the present invention in which rectangularly-shaped output pulses are produced and supplied to a load via a transformer;

FIG. 2 is a circuit schematic of a second embodiment of the present invention in which a grounded load is directly supplied with rectangularly-shaped output pulses;

FIG. 3 shows typical voltage waveforms appearing at critical points in the circuit depicted in FIG. 1; and FIG. 4 shows typical voltage waveforms appearing at critical points in the circuit depicted in FIG. 2.

Referring to the drawings, the waveforms illustrated in FIG. 3 correspond to the voltage-with-respect-to-ground which would be viewed at points 10, 11, 12, 13, 14, 15, and 16 in the circuit of FIG. 1. The voltage waveforms for the particular points are 110, 111, 112, 113, 114, 115, and 116 respectively. In the circuit, resistance R1 is a potentiometer, the voltage appearing at point 11 being a fraction of the total appearing at point 10 and dependent upon the position of slider 24. For purposes of discussion, it will be assumed that the input pulse amplitude is A volts and that the amplitude of the pulse appearing at point 11 is equal to A′ volts, A′ being the particular fraction of A determined by the setting of slider 24. Slider 24 is connected directly to base 25 of transistor 26, which is utilized as an emitter follower. Collector 27 of this transistor is tied to a suitable positive voltage and emitter 28 is connected to one side of capacitor C1, the other side of which is grounded. A diode selection circuit consisting of diodes D1, D2, primary 29 of transformer T1, and direct-current potential source P1, is connected between point 12 and point 13. In addition, it will be seen that secondary 30 of transformer T1 is grounded on one side and connected through load 31 to ground on the other side. Resistance R2 between input terminal 10 and point 13 provides means for absorbing power in order to permit diode D1 to serve as a pulse clipper, and resistance R3 provides a large time constant discharge path for capacitor C1 by shunting it to ground.

It should be noted that although the direct-current source P1 is depicted with the standard symbol for a battery, other suitable means for deriving such a source may easily be developed and employed by one skilled in the art without substantially departing from the spirit of this invention.

In order to understand the operation of this circuit when pulses are applied, consider first the application of a pulse to the input of FIG. 1 when the circuit is in a static state, i.e., when no pulses have previously been applied. This initial pulse is depicted as the left-hand pulse in waveform 110, FIG. 3. A fraction of this voltage is extracted from potentiometer R1 at point 11 by slider 24 and applied to base 25 of transistor 26. This fraction of the initial pulse is illustrated in wave form 111. Transistor 26 conducts providing current at emitter 28 when the voltage on base 25 exceeds the voltage at point 12. Under initial conditions, this voltage is determined by the series circuit comprising elements R1 in parallel with the resistance of the pulse source, R2, D2, primary winding 29, P1, and R3. Transistor 26 continues to conduct as long as the pulsed voltage applied to base 25 is in excess of the emitter potential. This conduction state charges capacitor C1 until its peak amplitude substantially corresponds to the peak amplitude of the pulse appearing on the base which, as has been previously mentioned, is A′. By suitable selection of components, the rise time of the charging current will closely approximate that of the voltage pulse appearing at point 11. Upon termination of the input pulse, transistor 26 is cut off, capacitor C1 discharges through resistance R3, and the voltage illustrated as waveform 112 results. The charge on capacitor C1, as it appears at point 12, is applied as a clamping voltage to the cathode of diode D1. This voltage is effective to clamp the incoming pulse to an amplitude not exceeding that appearing at point 12. The voltage appearing at point 13 is therefore as shown in waveform 113 in FIG. 3. Directly below it is a representation of the voltage appearing at point 14, waveform 114, which, it will be understood, is merely the result of subtracting the direct-current potential P1 from the voltage appearing at point 12. The voltage appearing at point 14 is applied to the cathode of diode D2 via primary 29 of transformer T1 holding this diode cut off for all voltages below that of point 14 minus the drop in the aforementioned primary winding. When the voltage at point 13 exceeds this value, as it does when an input pulse appears, diode D2 conducts and as a result causes the voltage appearing at point 15, waveform 115, to appear as the superposition of waveform 113 and waveform 114. Obviously, the voltage applied to primary 29 of transformer T1 is the difference between that appearing at point 15 and that appearing at point 14 and, as will be seen, is a substantially rectangular pulse. This pulse is applied to load 31 by conventional transformer action.

The characteristics of the first output pulse are determined by a number of different factors; its rise time by the charging time of capacitor C1, its amplitude by the value of potential source P1, and its decay time by the decay time of the input pulse. The rise time is directly determined by the charging time of capacitor C1, because it is the voltage appearing at its terminal, point 12, which is applied to diode D1 to clip the incoming pulse. The decay time is the decay time of the input pulse at the point the clipping occurs because the voltage at point 13 follows the input once diode D1 becomes nonconducting as a result of its cathode being held more positive than its anode. Because transformer T1 is employed merely to isolate the pulse shaping circuit from the load, thereby permitting the load to be grounded, the turns ratio is actually of no importance. If it be assumed that the transformer is ideal and that its turns ratio is 1:1, the amplitude of the pulse applied to load 31 is equal to the value of P1.

Assuming that a train of pulses is handled by this circuit, the pulses succeeding the first will have good rise time characteristics when the discharge time of capacitor C1 is slow in comparison with the period of the pulse repetition rate. The reason for this will be clear upon consideration of the second pulse appearing in the waveforms of FIG. 3. Here again, it will be seen that the input pulse is divided by potentiometer R1 and charges capacitor C1 to an amplitude equivalent to that appearing at point 11; however, as shown in waveform 112, because the capacitor has not appreciably discharged, only a slight increase in voltage at point 12 is experienced. The value at which the input pulse is clipped in this case, therefore, is not effected by the rise time of the pulse applied to base 25 of transistor 26 as it was when the first pulse was received. Consequently, the rise time of the clipped pulse appearing at point 13 is substantially shorter and is equivalent to the rise time of the input pulse. The voltage appearing at point 14, waveform 114, is again seen to be merely the difference between that appearing at point 12 and direct-current potential P1. The rise time of the small pulse resulting at point 15 when an input pulse is applied is in this instance seen initially to be shorter than in the case previously discussed. Upon considering the voltage drop in the windings of the primary of transformer T1, it will be seen that a rectangularly-shaped pulse is produced which has rise and decay times determined by those of the input pulse at the point the clipping occurred and a constant amplitude determined by direct-current source P1.

In effect, the output pulse may be looked upon as a sector of the input pulse which has been extracted at a point determined by the setting of potentiometer R1. The sector so extracted is illustrated in FIG. 3 as shaded portions in waveform 110. Clearly, the sector is selected so as to be above the type of noise hereinbefore described and yet far enough from the peak of the pulses to avoid the distortion present at the peak. Because the portion of the input pulse from which the sector is taken is dependent upon a ratio established by the setting of a potentiometer, the same portion of all input pulses will be extracted regardless of the amplitude of the original pulses. Thus, if the potentiometer is set to cause clipping of the input pulse at the 6 db point, all pulses will be clipped at their 6 db point regardless of their amplitude.

The circuit in FIG. 2 operates in a fashion very similar to that hereinbefore described in connection with the circuit in FIG. 1. The change observed in FIG. 2 is the substitution of transistor 37 and associated circuitry for the diode selection circuit of FIG. 1. This substitution makes it possible to supply a grounded load directly, whereas in the circuit of FIG. 1 it was necessary to employ a transformer.

Specifically, the circuit of FIG. 2 comprises transistor 34 controlled at base 33 by a pulse derived from potentiometer R4 via contacting slider 32, capacitor C2 charged by the emitter current of transistor 34 whenever an input pulse is applied, transistor 38 actuated by the input pulse applied to base 37 through resistor R5 and enabled by the charge on capacitor C2 applied to collector 40, clamping diode D3, limiting diode D4, and potential source P2. Resistor R6 provides a discharge path for capacitor C2 and is of such a value that the time constant of these elements is long compared to the pulse repetition rate. Resistor R7 provides a suitable load for the circuit of transistor 38, while capacitor C3 provides coupling to the anode of clamping diode D3, the cathode of which is connected to ground. The time constant of capacitor C3 in series with resistors R7 and R8 is chosen to be large with respect to the pulse repetition period in order to permit capacitor C3 to operate in conjunction with diode D3 as a clamp. The anode of diode D4 is connected to the negative terminal of potential source P2; therefore, whenever the voltage at its cathode tends to go below −P2 the diode conducts maintaining the voltage at least no more negative than −P2. Resistor R8 is the dissipating means that makes this possible. Load 41 is connected directly to the cathode of diode D4 on one side, and to ground on the other.

Before continuing, it should be noted that the waveforms in FIG. 4 are illustrations of typical voltages which occur at points 17, 18, 19, 20, 21, 22, and 23 in FIG. 2 when pulses are applied at the input. The voltage waveforms for the particular points are 117, 118, 119, 120, 121, 122, and 123, respectively, in FIG. 4.

Application of a first pulse to the input of the circuit in FIG. 2 will cause conduction of transistor 34 and charge capacitor C2 to approximately the voltage value existing at point 18 on the potentiometer. The appropriate voltages, assuming ideal conditions, are shown in FIG. 4 as: waveform 117, the input; waveform 118, the fraction of the input determined by the setting of potentiometer R4; and waveform 119, the voltage on capacitor C2 due to the charging thereof by emitter current from transistor 34 and its subsequent discharging through resistor R6.

The simultaneous application of the input pulse via resistor R5 to base 37 of transistor 38 while voltage is applied at point 19 due to the charge on capacitor C2 will result in transistor 38 conducting. The voltage appearing at point 20, waveform 120, will be noted to be very similar to that appearing at point 13 in FIG. 1 and is indicative of the clipping action performed by transistor 38. The shape of the voltage waveform appearing at point 21, waveform 121, is also similar to that just mentioned, differing only in respect to its relation to the zero axis, which is accounted for by the voltage across resistor R7 due to the current flow in resistor R7 upon termination of the applied pulse. The emitter current that flows when a pulse appears at point 20 charges capacitor C3 until it arrives at a full charge of approximately A′. Waveform 121 illustrates this charging action. Upon termination of the input pulse, the emitter current ceases and capacitor C3 begins to discharge. The discharge path consists of capacitor C3, resistor R7, ground, supply P2, diode D4, load resistor 41 in parallel with source P2 and diode D4, and resistor R8. Resistor R8 has been selected of considerably larger magnitude than resistor R7 and therefore the voltage drop across resistor R7 due to the discharge current is negligible, whereas the greatest portion of the voltage across capacitor C3 appears at point 22 as a negative voltage approximating in amplitude the full charge, A′. As hereinbefore mentioned, the time constant of the discharge circuit is long compared to the pulse repetition frequency, and therefore the voltage at point 22 remains substantially at —A′ volts during the period between successive pulses, as illustrated in waveform 122. When the voltage across load resistor 41 is considered, it will be apparent that due to the clipping action of diode D4, which is biased by source P2 to conduct whenever the voltage on its cathode seeks to descend below —P2, only pulses of amplitude P2 will be applied thereto. This is illustrated in waveform 123.

Scrutiny of the waveforms will indicate that the rise time of the first output pulse is equivalent to the rise time of the charge on capacitor C2 depicted on waveform 119. The decay time, however, is quite abrupt and independent of the capacitor charge, following instead the fall time of the input pulse, waveform 117.

When a second pulse appears, such as that illustrated in FIG. 4, it will be understood that the rise time is no longer equivalent to that of the charge on condenser C2, but is actually equivalent to that of the input pulse. The reason this is true has been explained before in connection with the operation of FIG. 1.

This illustrative description assumes that transistor 38 acting under ideal conditions will exhibit a voltage at its emitter, 39, which closely follows the voltage applied at its collector, 40, as long as base 37 is positive with respect to the emitter. The clipping of the input pulse is seen to take place at a voltage determined by the charge on capacitor C2 applied to collector 40. It is also apparent that the voltage at point 21 will never return to zero as long as the duration between pulses is short compared to the time constant of the discharge circuit for C3.

Considering waveform 122, it will be recalled that the charge on capacitor C3 following the termination of the input pulse caused point 22 to assume a negative voltage slightly less than A′ in magnitude. Upon application of the second pulse, point 21 is driven positive by a magnitude of A′ volts and consequently point 22 returns to zero, where it remains until the pulse is removed. As in the previous case, upon removal, the voltage at point 22 will return to a negative voltage slightly less than A′ in magnitude. This is also illustrated in waveform 122. Finally, due to the clipping of source P2 and diode D4 the output shows only a rectangularly-shaped pulse of amplitude P2. Effectively, this output has been derived from the shaded portion of the input pulse in waveform 117.

An important factor to be observed, in connection with the embodiments disclosed herein, is that following the first pulse, all others in the chain of pulses will be sampled at the same voltage level and should a different amplitude input pulse be applied, a period of time would be required before the circuit would be able to adjust itself to the new clipping level and thereby select the correct section of the new pulse.

The above description of the operation of two circuits serves to illustrate the principles involved in the present invention. It is to be understood that numerous changes may be made by those skilled in the art without departing from the spirit and teaching of this invention and for that reason, there is no intention of limiting it to the embodiments illustrated herein.

What is claimed is:

1. A solid-state pulse shaping circuit comprising, a source of pulses, adjustable means for extracting a voltage from said pulses having a fixed proportion to the amplitude thereof, pulse clipping means having a first and second terminal, means for applying said pulses directly to said first terminal, energy storage means having a discharge time several times greater than the period between said pulses, means having a high input impedance and a low output impedance coupling said adjustable means to said energy storage means to create a voltage therein proportional to said pulse amplitude, said energy storage means being connected to said second terminal to establish its clipping level as that of the voltage stored in said energy storage means, a unidirectional current conducting means, output means, and a voltage source, respectively serially connected between said first and second terminals and arranged to reject all voltages below the sum of said voltage source and the voltage on said energy storage means.

2. An automatic amplitude control and pulse shaping circuit comprising a source of input pulses, a main signal path, energy storage means, means shunting said main signal path for creating a voltage proportional to the amplitude of said input pulses, a transistor connected as an emitter follower and controlled by said means shunting said main signal path to charge said energy storage means, an output transformer having a primary winding and a secondary winding, a selection circuit connected to said primary winding, controlled by the charge on said energy storing means for selecting a predetermined sector of each of said input pulses for tranmission through said output transformer, and comprising a first unidirectional current conducting means biased by the charge stored in said energy storage means to conduct when said input pulses exceed the voltage level on said energy storing means and a second unidirectional current conducting means biased to pass to said primary winding voltages above a predetermined voltage level, and a load connected to said secondary winding.

References Cited in the file of this patent

UNITED STATES PATENTS

| | | |
|---|---|---|
| 2,098,370 | Bartels | Nov. 9, 1937 |
| 2,428,011 | Chatterjea et al. | Sept. 30, 1947 |
| 2,466,959 | Moore | Apr. 12, 1949 |
| 2,514,859 | Griffin et al. | July 11, 1950 |
| 2,613,272 | Terry et al. | Oct. 7, 1952 |
| 2,740,888 | Zukin | Apr. 3, 1956 |
| 2,755,441 | Gulnac | July 17, 1956 |
| 2,757,297 | Evans et al. | July 31, 1956 |
| 2,789,267 | Beal et al. | Apr. 16, 1957 |
| 2,890,352 | Goodrich | June 9, 1959 |